United States Patent [19]

Kawamura et al.

[11] Patent Number: 4,959,597

[45] Date of Patent: Sep. 25, 1990

[54] NUMERICAL CONTROL APPARATUS

[75] Inventors: Hideaki Kawamura, Hachioji; Kentaro Fujibayashi, Musashino; Toshiaki Otsuki, Hino, all of Japan

[73] Assignee: Fanuc Ltd, Minamitsuru, Japan

[21] Appl. No.: 314,057

[22] PCT Filed: Jul. 28, 1988

[86] PCT No.: PCT/JP88/00761

§ 371 Date: Feb. 8, 1989

§ 102(e) Date: Feb. 8, 1989

[87] PCT Pub. No.: WO89/01195

PCT Pub. Date: Feb. 9, 1989

[30] Foreign Application Priority Data

Jul. 30, 1987 [JP] Japan ................................. 62-191343

[51] Int. Cl.$^5$ ........................................... G05B 19/445
[52] U.S. Cl. .............................. 318/568.15; 318/574; 318/573; 364/474.29; 364/474.31
[58] Field of Search .................................. 318/560–578; 364/474, 29, 513, 474.30, 474.31, 474.32, 474.33, 474.34; 901/3, 9, 15, 20–24

[56] References Cited

U.S. PATENT DOCUMENTS

| | | | |
|---|---|---|---|
| 2,883,110 | 4/1959 | Spencer et al. | 318/573 X |
| 3,026,040 | 3/1962 | Spencer | 318/573 |
| 4,423,481 | 12/1983 | Reid-Green et al. | 364/474.31 |
| 4,550,383 | 10/1985 | Sugimoto | 364/513 |
| 4,590,577 | 5/1986 | Nio et al. | 364/513 |
| 4,648,024 | 3/1987 | Kato et al. | 364/474.29 |
| 4,689,750 | 8/1987 | Kishi et al. | 364/474.29 X |
| 4,728,872 | 3/1988 | Kishi et al. | 318/603 X |
| 4,821,207 | 4/1989 | Ming et al. | 364/474.31 X |
| 4,835,710 | 5/1989 | Schnelle et al. | 318/574 X |

FOREIGN PATENT DOCUMENTS

WO84/04828 12/1984 PCT Int'l Appl. ............ 318/568.15

Primary Examiner—William M. Shoop, Jr.
Assistant Examiner—Paul Ip
Attorney, Agent, or Firm—Staas & Halsey

[57] ABSTRACT

A numerical control apparatus according to the invention for interpolatory control of a tool along the shape of a workpiece to be machined. In order to perform offsetting of a cutting tool by an amount equivalent to the tool diameter when involute interpolation is carried out, an involute curve is approximated by a circular which is set in dependence upon the intersection angle of a machining trajectory at a command point commanding the start of machining.

11 Claims, 3 Drawing Sheets

NUMERICAL CONTROL APPARATUS

BACKGROUND OF THE INVENTION

1. Field of the Invention

This invention relates to a numerical control apparatus for interpolatory control of a tool along the shape of a workpiece to be machined.

2. Description of the Related Art

If a workpiece formed into a predetermined shape is to be milled by a tool of radius r, the path along which the center of the tool is to pass must be set as a path spaced away from the contour of the workpiece by the distance r when an ordinary machining program is created. Spacing the tool a certain distance away from the contour in this manner is referred to as "offsetting" the tool. An ordinary numerical control apparatus has a tool diameter compensating function for forming such an offset path.

Besides being required for linear and circular interpolation, this tool diameter compensation is also required when performing interpolation based on an involute curve in order to cut a gear or the vanes of a pump by a machine tool. The applicant has already filed an application for an invention regarding an interpolating system in which an involute curve can be simply interpolated within a numerical control apparatus (U.S. application Ser. No. 07/309,644). In accordance with this system, problems in terms of a pulse distribution relating to tool velocity possessed by conventional involute interpolation are solved and it is possible to perform high-speed interpolatory computations by circular interpolation.

In a numerical control apparatus having such a tool diameter compensating function, high-speed computation which will not restrict the tool traveling velocity is required in order to perform an offset computation for approximating the involute curve by a circular arc and to control the machine tool so that the workpiece is machined according to the shape along the involute curve.

SUMMARY OF THE INVENTION

The present invention has been devised in order to solve this problem of the prior art. The object of the present invention is to provide a numerical control apparatus in which a designated involute curve is approximated by a circular arc and an offset value corresponding to a tool diameter is computed at high speed to effect interpolatory control of the tool.

According to the present invention, there is provided a numerical control apparatus having a tool control function for machining a workpiece into a shape along an involute curve, comprising setting means for setting an approximation circle approximating the involute curve in accordance with an intersection angle at a command point commanding the start of machining along the involute curve, arithmetic means for computing an offset vector at the command point from the set approximation circle and an offset vector of a tool trajectory up to the command point, and interpolating means for interpolating an involute curve offset by a tool diameter based on the offset vector of the tool.

Accordingly, the numerical control apparatus of the present invention is such that when a tool path is computed from point sequence data designating an involute curve, an approximation circle is set in dependence upon the intersection angle at the command point, and an offset vector is computed from the approximation circle and the tool trajectory up to the command point. As a result, a tool diameter offset computation can be performed at high speed.

DESCRIPTION OF THE PREFERRED EMBODIMENT

An embodiment of the present invention will now be described in detail with reference to the drawings.

Figure 3:
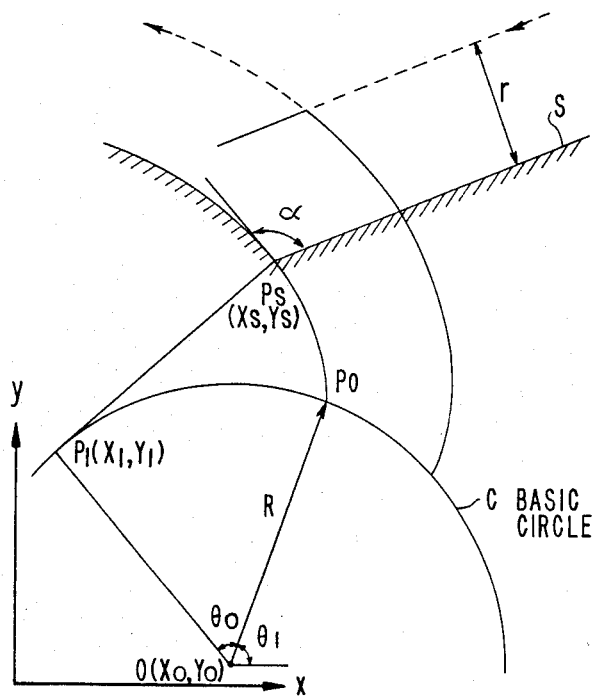
FIG. 3 is a diagram illustrating an example of an involute curve.

FIG. 3 illustrates an example of an involute curve. Here the involute curve is defined as the trajectory of a point at which the length of a tangent line becomes equal to the length of an arc $\overparen{P_0P}$, the tangent line of the circle being drawn at a point P obtained by counter-clockwise movement from a starting point $P_0$ on the circumference of a basic circle C of center coordinates O $(X_0,Y_0)$ and radius R. If a portion of the machining shape S of a workpiece contains the involute curve, the coordinates of a command point $P_s$ $(X_s,Y_s)$ defined as the involute curve are given as follows:

$$X_s = X_0 + R(\cos\theta + \theta_0 \sin\theta)$$

$$Y_s = Y_0 + R(\sin\theta + \theta_0 \cos\theta)$$

where $\theta = \theta_1 + \theta_0$.

The trajectory of tool movement indicated by the broken line in FIG. 3 is spaced away from the machining surface S perpendicularly by a distance r corresponding to the tool diameter and, when the machining trajectory has been decided, can be determined from the offset vector corresponding to each point. The problem encountered here is the method of calculating the offset vector at the command point $P_s$. In order to compute this offset vector in accordance with the present invention, the following three approximation circles which approximate the involute curve are set, and a circle is selected in dependence upon the magnitude of an intersection angle $\alpha$ at the command point $P_s$.

(1) When the intersection angle $\alpha$ is greater than 150°

Figure 4:
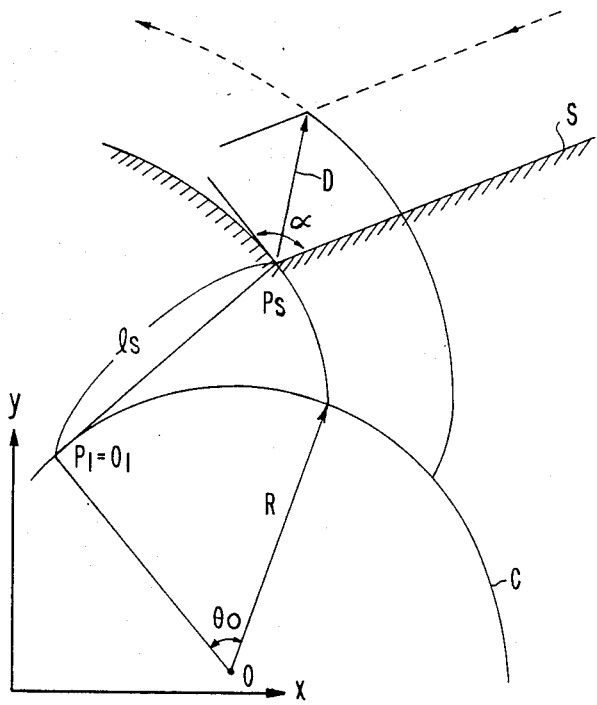
FIGS. 4 through 6 are diagrams for describing methods of setting approximation circles.

As shown in FIG. 4, an offset D when shifting from linear interpolation to circular interpolation is computed adopting as an approximation circle a circle $O_1$ having command point $P_s$ and a radius of curvature which is the length of a tangent line $l_s$ up to a point $P_1$ at which it is tangent to the basic circle.

(2) When the intersection angle $\alpha$ is greater than 60° and less than 150°

Figure 5:
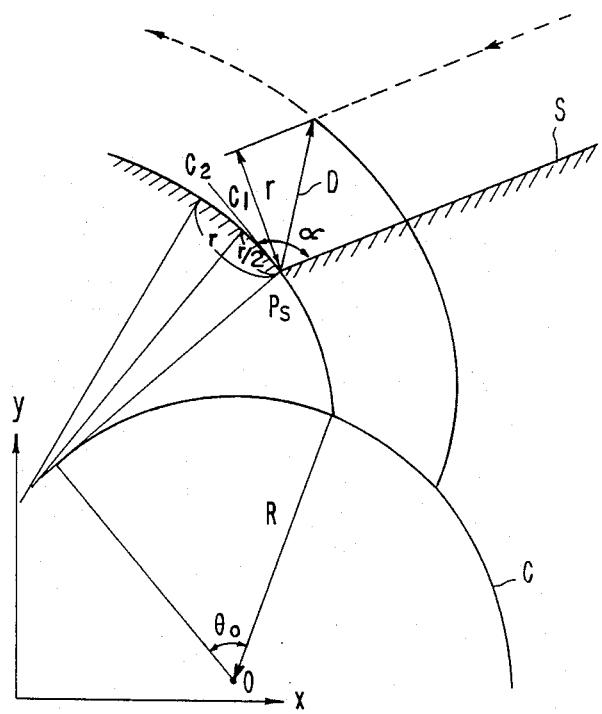

As shown in FIG. 5, an offset D when shifting from linear interpolation to circular interpolation is computed adopting as an approximation circle a circle defined by the command point $P_s$ and points $C_1$, $C_2$ on the involute curve and spaced away from $P_s$ by r/2, r, respectively.

(3) When the intersection angle $\alpha$ is less than 60°

Figure 6:
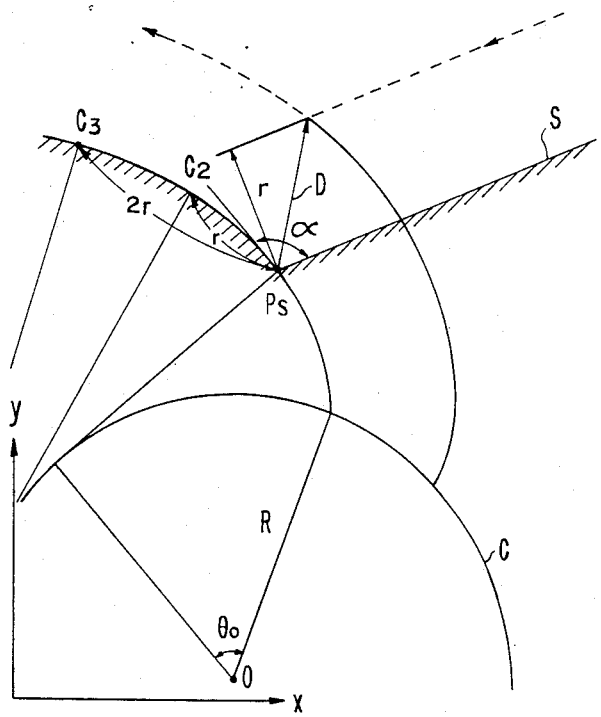

As shown in FIG. 6, an offset D when shifting from linear interpolation to circular interpolation is computed adopting as an approximation circle a circle defined by the command point $P_s$ and points $C_2$, $C_3$ on the involute curve and spaced away from $P_s$ by r, 2r, respectively.

A numerical control apparatus for interpolating an offset involute curve will now be described with reference to the block diagram of FIG. 1.

Figure 1:
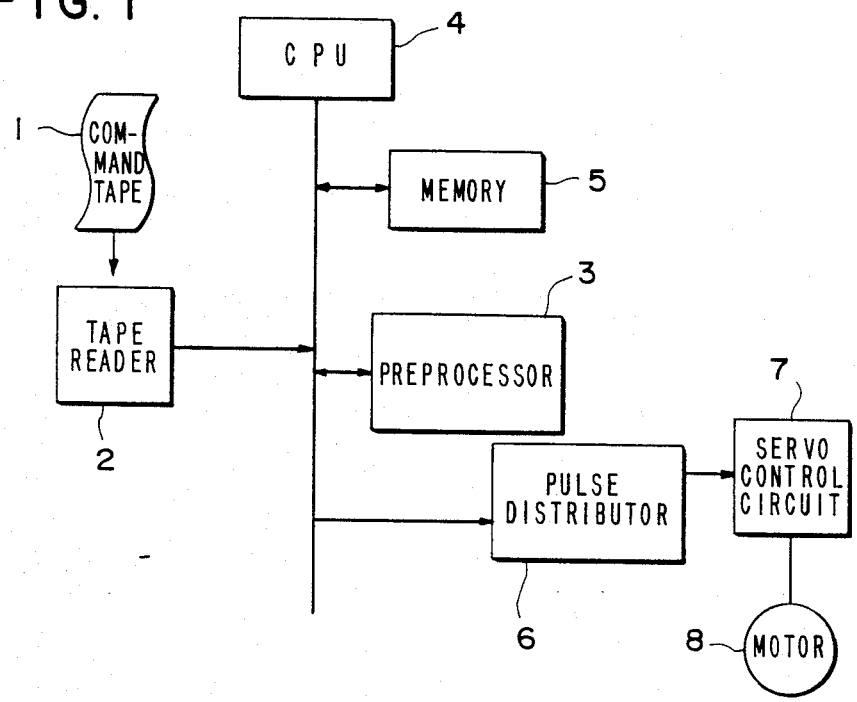
FIG. 1 is a block diagram illustrating an embodiment of the present invention.

In FIG. 1, numeral 1 denotes a command tape in which the commands already described are punched. Numeral 2 denotes a tape reader for reading data regarding tool movement from the tape 1. Numeral 3 denotes preprocessing means which, when the data includes the G code of an involute interpolation command, sets an approximation circle which approximates the involute curve based on the command point Ps and the intersection angle $\alpha$ at this point. Numeral 4 denotes a CPU which calculates an offset vector based on the set approximation circle, outputs a program for originating interpolation data from a memory 5, and computes a tool trajectory. The interpolation data thus originated are distributed as commanded pulses along each axis of the tool by a pulse distributor 6. Numeral 7 denotes a servo-control circuit for driving a servomotor 8, which moves the tool via a ball screw or the like.

Figure 2:
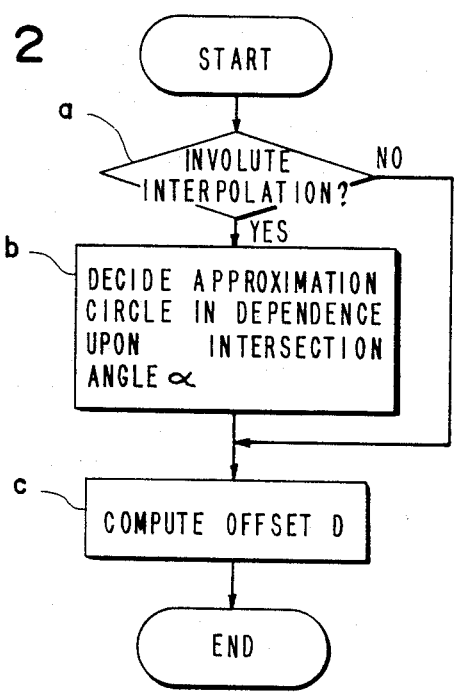
FIG. 2 is a flowchart illustrating computation steps.

FIG. 2 is a flowchart illustrating steps for calculating an offset D in the CPU 4. When an involute interpolation command, of the type shown below, is inputted from the tape 1 (step a), an approximation circle is decided in dependence upon the intersection angle $\alpha$ (step b) and an offset vector is calculated based thereon (step c).

The involute interpolation command is given as

G17G03.1X—Y—I—J—R—F—;

The X-Y plane is designated by G17, counter-clockwise involute interpolation is commanded by G03.1, the coordinates of the end point of an involute curve are designated by X—Y—, and the command point $P_s$, which becomes the starting point on the involute curve at a distance from the center of the basic circle C, is designated by I—J—. It should be noted that R— is the value of the radius of the basic circle and F— is the feed velocity of the tool.

Thus, with the numerical control apparatus of the embodiment described above, various approximated circles are set at the time of involute interpolation, and the optimum approximated circle is selected upon giving special attention to the fact that, among such elements as $\theta_0$, r and R which stipulate the offset vector, the influence of the intersection angle $\alpha$ at the command point $P_s$ is large. Therefore, the apparatus not only raises computation speed but also makes it possible to minimize error. It should be noted that the branch angles 60° and 150° of $\alpha$ are optimum values in terms of calculation. In actuality, there are times when other values are chosen because of the machining tool and other elements which stipulate the precision of approximation circle computation.

In other words, instead of approximation circles of (2) and (3) mentioned above, it is permissible to stipulate an approximation circle by respectively setting the distances from the command point $P_s$ on the involute curve to r/2tan $(\alpha/2)$, r/tan$(\alpha/2)$ by way of example.

Though an embodiment of the invention has been described, the invention is not limited thereto. For example, in a case where an involute curve is set in the clockwise direction or in a case where an involute curve is set in the vicinity of the basic curve, the invention can be applied in a similar manner. The invention can be modified in a variety of ways within the gist of the invention without departing from the scope of the claims.

The numerical control apparatus of the present invention is such that a designated involute curve is approximated by a circular arc and an offset vector corresponding to tool diameter is computed at high speed to enable interpolatory control of the tool along the shape of a workpiece.

What is claimed is:

1. A numerical control apparatus having a tool control function for machining a workpiece into a shape along an involute curve, comprising:

setting means for setting an approximation circle approximating the involute curve in accordance with an intersection angle at a command point commanding the start of machining along the involute curve;

arithmetic means for computing a command point offset vector at the command point based on both the approximation circle and a tool offset quantity of a tool trajectory up to the command point; and interpolating means for interpolating the involute curve as offset by a tool diameter based on the command point offset vector.

2. A numerical control apparatus according to claim 1, wherein said setting means comprises:

means for deciding, with respect to the tool offset quantity r of the tool, a first approximation circle having a radius of curvature stipulated by a tangent line of a basic circle of the involute curve at the command point;

means for deciding a second approximation circle stipulated by the command point and two points on the involute curve separated from the command point by distances r/2, r;

means for deciding a third approximation circle stipulated by the command point and two points on the involute curve separated from the command point by distances r, 2r;

means for computing the intersection angle at the command point; and means for selecting, based on the intersection angle, one of the first, second and third approximation circles to minimize error.

3. A numerical control apparatus according to claim 1, wherein said setting means comprises:

means for deciding, with respect to an offset quantity r of the tool, a first approximation circle having a radius of curvature stipulated by a tangent line of a basic circle of the involute curve at the command point;

means for deciding a second approximation circle stipulated by the command point and two points on the involute curve separated from the command point ;by distances r/2tan$(\alpha/2)$, r/tan$(\alpha/2)$;

means for deciding a third approximation circle stipulated by the command point and two points on the involute curve separated from the command point by distances r/tan$(\alpha/2)$, 2r/tan$(\alpha/2)$;

means for computing the intersection angle at the command point; and means for selecting, based on the computed intersection angle, one of the first, second and third approximation circles to minimize error.

4. A numerical control apparatus for machining a workpiece with a tool along an involute curve, the involute curve having a command point and an intersection angle with a magnitude, the tool having a tool offset quantity, said apparatus comprising:

curve approximation means for approximating the involute curve with an approximate circle based upon the magnitude of the intersection angle;

interpolation means for switching from offset linear interpolation to offset circular interpolation at the command point; and processor means for calculating an offset vector at the command point based on the approximate circle and the tool offset quantity, and for outputting circular interpolation data to machine the workpiece.

5. A numerical control apparatus according to claim 4, wherein said curve approximation means comprises:

means for computing the magnitude of the intersection angle; and means for providing a first approximate circle with respect to the tool offset quantity r of the tool having a radius stipulated by a tangent line to a basic circle of the involute curve at the command point.

6. A numerical control apparatus according to claim 5, wherein said curve approximation means further comprises:

means for providing a second approximate circle stipulated by the command point and two points on the involute curve separated from the command point by distances $r/2\tan(\alpha/2)$ and $r/\tan(\alpha/2)$, respectively; and means for selecting one of the first and second approximate circles based on the magnitude of the intersection angle.

7. A method for machining a workpiece with a tool along an involute curve, the involute curve having a command point and an intersection angle with a magnitude, said method comprising the steps of:

(a) switching from offset linear interpolation to offset circular interpolation at the command point;

(b) approximating the involute curve with an approximate circle based upon the magnitude of the intersection angle;

(c) calculating an offset vector based on the approximate circle and outputting circular interpolation data to machine the workpiece; and (d) converting the circular interpolation data into signals for controlling the machining of the workpiece.

8. A method according to claim 7, wherein said approximating of step (b) comprises the steps of:

(i) computing the magnitude of the intersection angle; and (ii) providing a first approximate circle with respect to an offset quantity r of the tool having a radius stipulated by a tangent line to a basic circle of the involute curve at the command point.

9. A method according to claim 8, wherein said approximating of step (b) further comprises the steps of:

(iii) providing a second approximate circle stipulated by the command point and two points on the involute curve separated from the command point by distances $r/2\tan(\alpha/2)$ ;and $r/\tan(\alpha/2)$, respectively; and (iv) selecting one of the first and second approximate circles based on the magnitude of the intersection angle.

10. A numerical control apparatus according to claim 4, wherein said apparatus further comprises servo control means for machining the workpiece in accordance with the circular interpolation data.

11. A method according to claim 7, wherein said method further comprises the step (e) machining the workpiece in accordance with the circular interpolation data.

* * * * *

UNITED STATES PATENT AND TRADEMARK OFFICE
CERTIFICATE OF CORRECTION

PATENT NO. : 4,959,597
DATED : September 25, 1990
INVENTOR(S) : Kawamura et al.

It is certified that error appears in the above-identified patent and that said Letters Patent is hereby corrected as shown below:

ON THE TITLE PAGE:
IN THE ABSTRACT, line 6, change "circular" to --circular arc--.

Col. 2, line 54, change "$l_s$" to --$\ell_s$--;

Col. 4, line 62, change "point ;by" to --point by--.

Col. 6, line 28, change "; and" to --and--.

Signed and Sealed this

Seventeenth Day of March, 1992

Attest:

HARRY F. MANBECK, JR.

*Attesting Officer*　　　*Commissioner of Patents and Trademarks*